United States Patent [19]

Shiojiri

[11] Patent Number: 5,894,518

[45] Date of Patent: *Apr. 13, 1999

[54] PICTURE INFORMATION TRANSMISSION SYSTEM AND PICTURE CODING AND DECODING APPARATUS FOR USE WITH IT

[75] Inventor: Hirohisa Shiojiri, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/739,154

[22] Filed: Oct. 30, 1996

Related U.S. Application Data

[63] Continuation of application No. 08/334,798, Nov. 4, 1994, abandoned, which is a continuation of application No. 08/044,642, Apr. 8, 1993, abandoned.

[30] Foreign Application Priority Data

Apr. 8, 1992 [JP] Japan ..................... 4-115325

[51] Int. Cl.⁶ ..................... H04N 7/167; H04N 7/12
[52] U.S. Cl. ..................... 380/20; 348/400; 380/10
[58] Field of Search ..................... 380/11, 14, 20; 348/400

[56] References Cited

U.S. PATENT DOCUMENTS

| | | | |
|---|---|---|---|
| 5,007,084 | 4/1991 | Materna et al. | 380/10 |
| 5,091,937 | 2/1992 | Kawasaki | 380/10 |
| 5,153,720 | 10/1992 | Kawai | 348/19 |
| 5,199,067 | 3/1993 | Leduc et al. | 380/10 |
| 5,258,836 | 11/1993 | Murata | 348/19 |
| 5,537,147 | 7/1996 | Tahara | 348/400 |

OTHER PUBLICATIONS

NTSC Color Television Standards; D.G. Fink; McGraw-Hill Book Co., Inc.; NY, 1955.

*Primary Examiner*—Stephen C. Buczinski
*Attorney, Agent, or Firm*—Ostrolenk, Faber, Gerb & Soffen, LLP

[57] ABSTRACT

A picture information transmission system enciphers and transmits picture information after interframe coding so that a receiving apparatus which does not have a cipher decoding device can decode and display the picture at an arbitrary time to allow potential customers to view the image for advertising purposes. The system is constructed so that coding is stopped for a predetermined period of time, and for one of a plurality of regions of each frame within the period, data are successively coded by intraframe coding before the data are outputted.

14 Claims, 8 Drawing Sheets

PICTURE INFORMATION TRANSMISSION SYSTEM AND PICTURE CODING AND DECODING APPARATUS FOR USE WITH IT

This is a continuation of Application Ser. No. 08/334,798 filed on Nov. 4, 1994, now abandoned which is a Continuation of Application Ser. No. 08/044,642, filed on Apr. 8, 1993 now abandoned.

BACKGROUND OF THE INVENTION

1. Field of the Invention

This invention relates to a picture information transmission system and picture coding and decoding apparatus for use with the picture information transmission system, and particularly to a picture information transmission system which codes a moving picture based on temporal correlation (interframing coding) and enciphers and transmits the coded picture.

2. Description of the Related Art

In picture information transmission systems which code picture information based on interframe frame coding and encipher and transmit the coded picture information, it is generally impossible to control switching between proceeding and stopping of encipherment or, even if this is possible, the switching is only possible at the end of long time intervals. For example, in transmission of a moving picture formed of a large number of successive frames, proceeding/stopping of encipherment cannot be switched for a minimum of at least about two hours.

Therefore, a receiver apparatus which does not have a cipher decoding device cannot effect decoding and therefore, cannot display any part of a correct picture while encipherment is proceeding on the transmission side (in the example described above, for a minimum of at least about two hours).

SUMMARY OF THE INVENTION

It is an object of the present invention to provide a picture information transmission system wherein even a receiving terminal which does not have a cipher decoding device can intermittently effect decoding and display of a picture so that a picture information may be provided to a non-subscriber to allow the non-subscriber to view the picture for advertising purposes. It is also an object of this invention to provide picture coding and decoding apparatus for use with the invertive picture information transmission system.

According to one aspect of the present invention, there is provided a picture information transmission system which codes a picture using temporal correlation between frames and enciphers and transmits the coded information, wherein each frame is imaginarily divided into first to Nth continuous regions, N being an integral number equal to or greater than 2, and determining a predetermined frame of picture information to be transmitted as a first frame, coding based on spatial correlation (inframe coding) is performed for data in an Ith region of an Ith frame from at least one of the successive frames from the first to the Nth frame while encipherment is stopped for a period consisting of the first to Nth frames to transmit the data of the first to the Nth frames, I being an arbitrary integral number from 1 to N.

According to another aspect of the present invention, there is provided a picture coding apparatus, which comprises coding means for coding picture information using temporal a correlation between frames, encipherment means for enciphering a coded output of the coding means and sending out a cipher output, means for controlling the coding means so that, when each frame is imaginarily divided into first to Nth continuous regions, N being an integral number equal to or greater than 2, determining a predetermined frame of picture information to be transmitted as a first frame, coding based on spatial correlation is performed for data in an Ith region of an Ith frame from at least one of the successive frames from the first to the Nth frame, I being an arbitrary integral number from 1 to N, and means for controlling the encipherment means to stop encipherment for a period consisting of the first to the Nth frames.

According to a further aspect of the present invention, there is provided a picture information decoding apparatus for a picture information transmission system wherein, when each frame is imaginarily divided into first to Nth continuous regions, N being an integral number equal to or greater than 2, determining a predetermined frame of picture information to be transmitted as a first frame, coding based on spatial correlation is performed for data in an Ith region of an Ith frame from at least one of the successive frames from the first to the Nth frame, I being an arbitrary integral number from 1 to N, and encipherment of the encipherment means is stopped for a period consisting of the first to the Nth frames to transmit the data of the first to the Nth frames whereas information other than the data of the Ith region is coded based on temporal correlation between frames and then enciphered and transmitted, wherein the decoding apparatus comprises means for decoding, while data of the first to the Nth frames are received, the data in each Ith region of each of the first to the Nth frames based on spatial correlation but decoding data in the other regions based on temporal correlation.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

Figure 1:
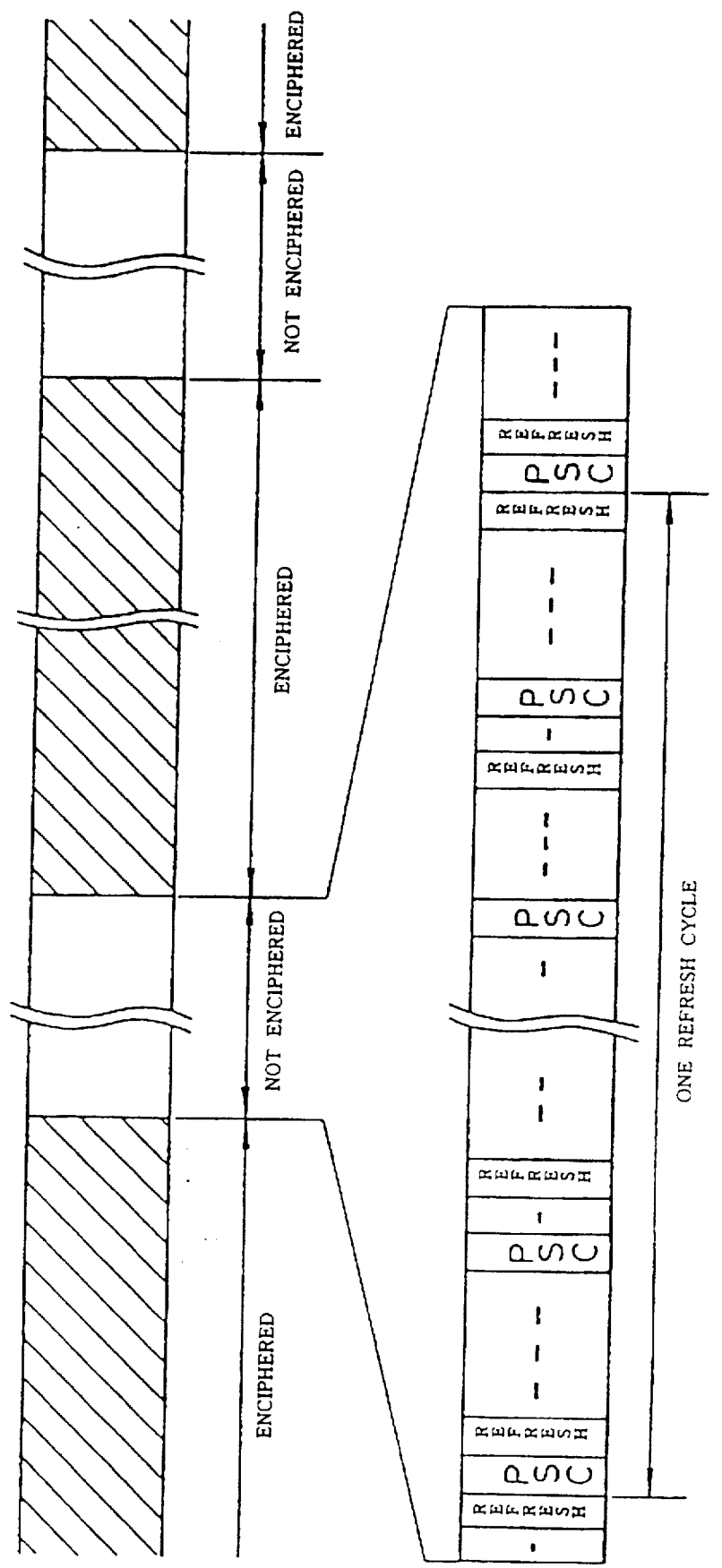
FIG. 1 is a time chart illustrating the principle of a picture enciphering transmission system according to the present invention.
Figure 2:
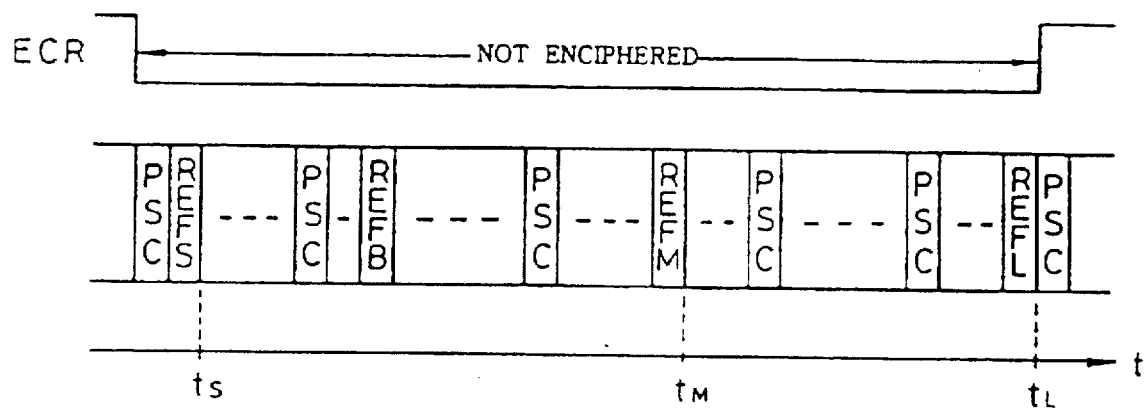
FIGS. 2(a) and 2(b) are diagrams illustrating details of the principle of the picture enciphering transmission system according to the present invention.
Figure 2:
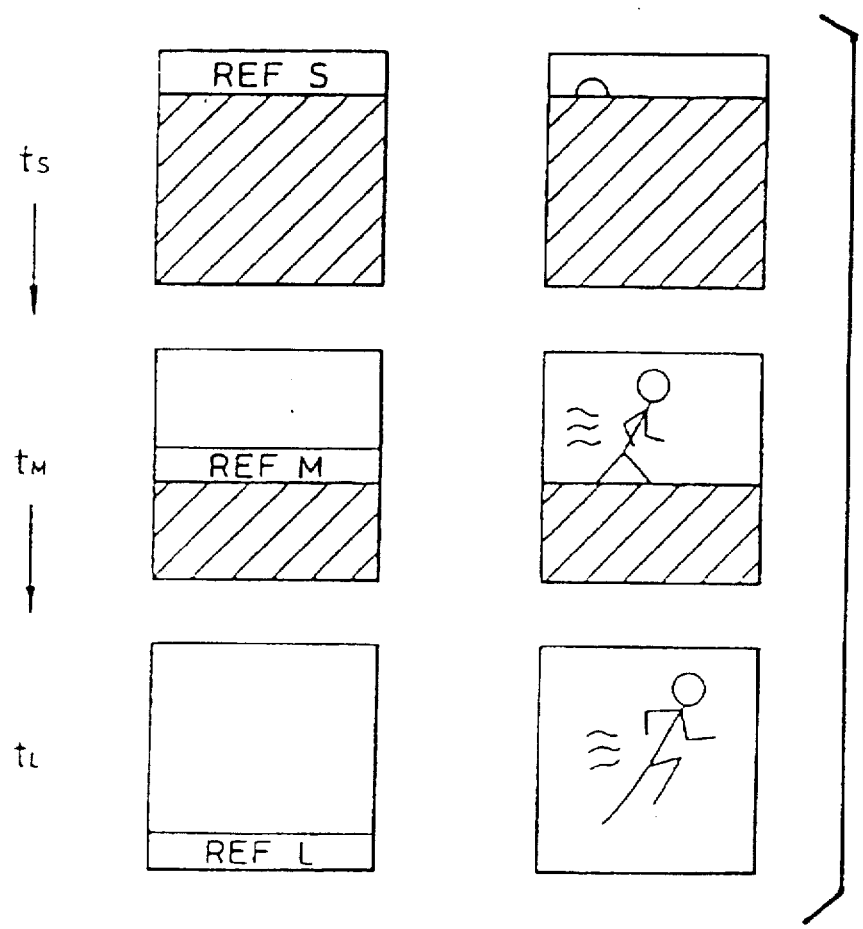

FIGS. 1 and 2 illustrate picture data transmitted by the picture enciphering transmission system of the present invention and contents of display of a screen.

FIG. 1 illustrates a plurality of segments, some enciphered and others not enciphered, of a coded picture signal, for example, a television signal. Each picture signal segment includes a plurality of frames of the coded picture signal, each frame being comprised of a portion of the coded data comprising the coded picture signal. Each frame contains coded data representing a single picture (of a plurality of motion pictures, for example) for display on a screen, such as a television screen, for example. The output medium or screen may be divided into a plurality of regions, and each frame may also be divided into a like number of regions, wherein each frame region contains coded data corresponding to at least one screen region.

A single frame of the coded picture signal extends from one page starting signal PSC to the next. Each frame of the not enciphered picture region includes a region represented as REFRESH. The REFRESH region includes coded data for a portion of the frame in question, which data is coded in a mode (hereinafter referred to as intraframe mode) in which all of the original picture data for the frame (or a portion thereof) can be reproduced without reference to the last frame or any other preceding frame in the picture signal.

The coded data comprising the remainder of each frame of the not enciphered picture segment (that is, the coded data comprising the non-REFRESH regions of each such frame) are coded in another mode (hereinafter referred to as interframe mode) in which reproduction of the original picture data for any given frame (or a portion thereof) requires reference to at least one prior frame in the picture signal. In the following example, interframe coding uses only the immediately preceding frame.

In the example shown in FIG. 1, one not enciphered picture signal segment is divided into N frames (N being an integral number equal to or greater than 2). A region of one or more frames in this segment is encoded in the intraframe mode, each such region being represented in the illustration as REFRESH. In the illustrated embodiment, a region in each of the frames is encoded in the intraframe mode.

In FIG. 1, the not enciphered picture segment extends for a period of time (hereinafter referred to as one refresh cycle) during which coding is performed at least once in the intraframe mode for picture data corresponding to each screen region. That is, a frame region corresponding to each screen region is coded at least once in the intraframe mode during the refresh cycle. As a result, even when the picture signal is received by a receiver apparatus which is unable to decode enciphered data, a full screen of picture data is decoded and displayed correctly by the receiver apparatus. The operation is illustrated in FIGS. 2(a) and 2(b).

FIG. 2(a) shows the not enciphered picture signal segment of the picture signal illustrated in FIG. 1, and FIG. 2(b) illustrates a manner in which a full screen of picture data is decoded correctly and displayed on the screen based on the not enciphered picture signal segment.

Portions represented as REFS, REFM and REFL in FIG. 2(b) denote regions in which data are decoded in the intraframe mode for the screen, and each slanting line portion indicates a picture fixed to a certain level so as to avoid a scrambled picture from being displayed.

At the uppermost stage in FIG. 2(b), the display screen of a picture obtained by decoding of a first frame of a notenciphered picture signal segment is shown. Since only one region of the frame has been coded in the intraframe mode (corresponding to a first screen region), the picture can be decoded correctly in only that one frame region, and thus only the corresponding first screen region of the picture can be displayed.

In a second frame, making use of the frame region decoded correctly in the first frame, two screen regions of a picture may be displayed correctly. In particular, picture data for the first screen region may be decoded by using the intraframe coded data for the first screen region decoded from the first frame, together with the interframe data for the first screen region found in this second frame. Moreover, the second frame contains a second frame region coded in the intraframe mode, corresponding to a second screen region. Thus, the second screen region may also be decoded. Accordingly, the first and second frames contain sufficient coded data to display two regions of the screen correctly, and intraframe coding has only been performed once for each screen region.

Thereafter, similar operations are repeated so that other screen regions are successively decoded and displayed (this corresponds to the middle stage in FIG. 2(b)), and finally at the point in time when a frame region coded in the intraframe mode has been decoded for each screen region, that is, at the point when one refresh cycle is completed, a full screen is displayed correctly (the lowermost stage in FIG. 2(b)). This full screen correponds to the picture represented by the Nth frame of the N frames required to decode and display the full screen.

An example of construction of a picture coding apparatus which realizes the picture enciphering transmission method according to the present invention and operation of the picture coding apparatus are described below with reference to FIGS. 3, 4 and 5.

Figure 3:
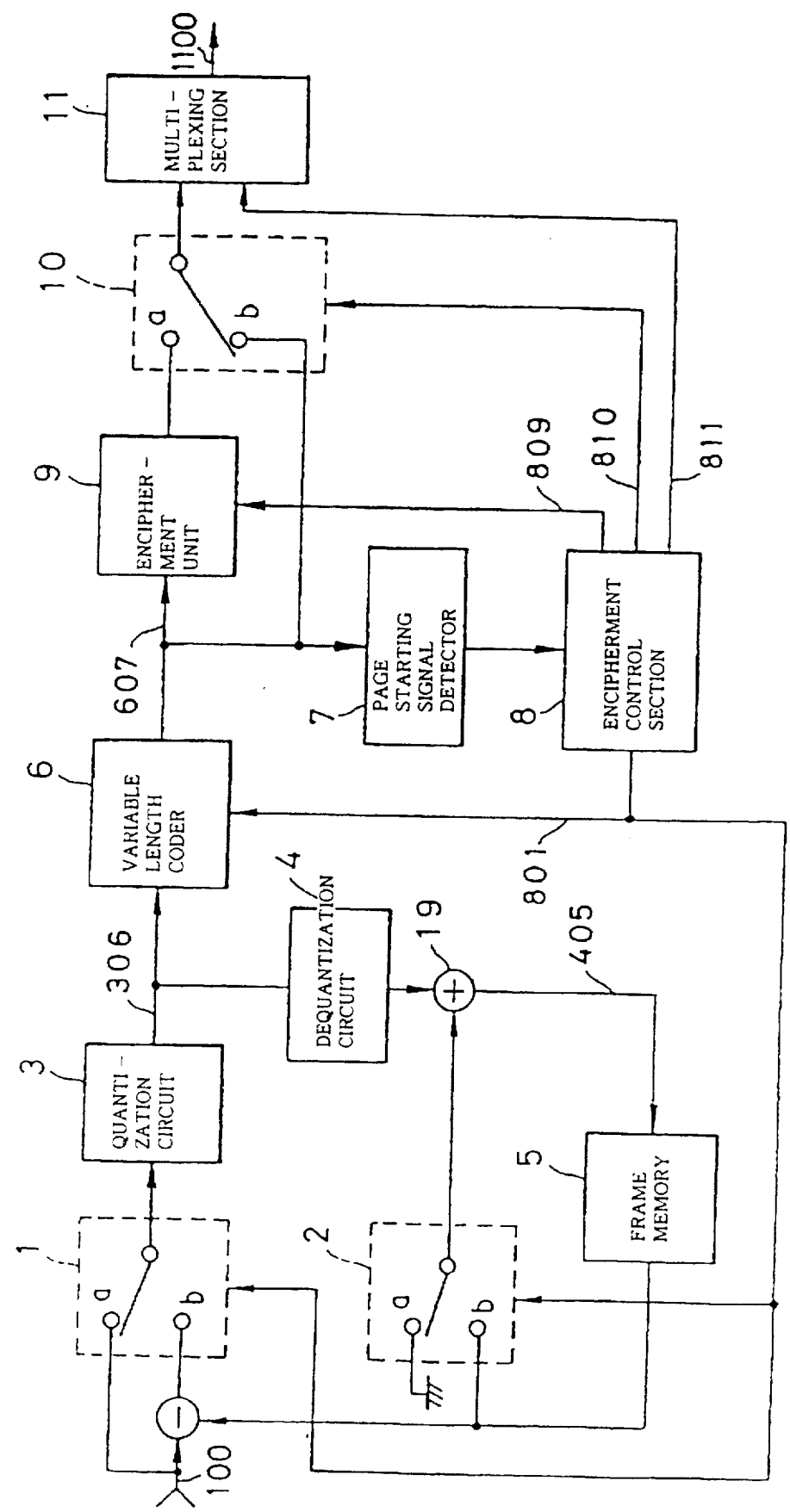
FIG. 3 is a block diagram of a picture coding apparatus of an embodiment of the present invention.

FIG. 3 shows an example of the picture coding apparatus which realizes the image enciphering transmission system according to the present invention. Referring to FIG. 3, the block including picture switch 1, picture switch 2, quantization circuit 3, dequantization circuit 4, frame memory 5 and variable length coder 6 serves as a coding section which executes variable length coding making use of a correlation of moving picture data in the time axis direction. Picture switches 1 and 2 are operatively connected to each other, and when both switches are connected to respective contacts a, the intraframe mode is established, but when both switches are connected to respective contacts b, the interframe mode is established.

Quantization circuit 3 quantizes a picture while adaptively varying its quantization step in response to a generated amount of coded data or the like. Variable length coder 6 codes quantized picture 306 by variable length coding and simultaneously adds a PSC code indicative of the head of a frame. Variable length coder 6 further adds, for each region in the frame, a flag indicating whether coding has been executed in the intraframe mode or in the interframe mode.

Here, operation in the intraframe mode and the interframe mode is described.

First, in the intraframe mode in which the switches are both connected to contacts a, picture data 100 inputted is quantized by quantization circuit 3 (signal 306) and then coded into a variable length code by variable length coder 6 (signal 607). In this instance, quantized picture data 306 is simultaneously inputted to dequantization circuit 4. The output of dequantization circuit 4 is inputted to adder 19. Thereupon, since picture switch 2 is connected to contact a, the output of dequantization circuit 4 is inputted as it is to frame memory 5. This signal 405 is called a locally decoded picture and is utilized to code a next frame when the interframe mode is used.

In coding in the interframe mode, picture switches 1 and 2 are both connected to respective contacts b. Consequently, the difference of input picture 100 from the output of frame memory 5, that is, from the locally decoded signal, is calculated, and the result of the calculation is inputted to quantization circuit 3. The result of the quantization is coded into a variable length code by variable length coder 6. Further, similar to intraframe coding, the output of quantization circuit 3 is dequantized by dequantization circuit 4, and the result of the dequantization is added to the output of frame memory 5 by adder 19 and inputted as a locally decoded picture to frame memory 5. The reason why the addition is necessary is that the output of picture switch 1 presents the difference from the last frame.

Switching between the intraframe mode and the interframe mode is performed in response to an instruction from encipherment control section 8. Encipherment control section 8 generates a refresh instruction signal 801 so that data in one region are successively coded by interframe coding for each one frame of picture input 100. In response to refresh instruction signal 801, switching of picture switches 1 and 2 and addition of a flag indicating interframe coding/intraframe coding by variable length coder 6 are executed.

Figure 4:
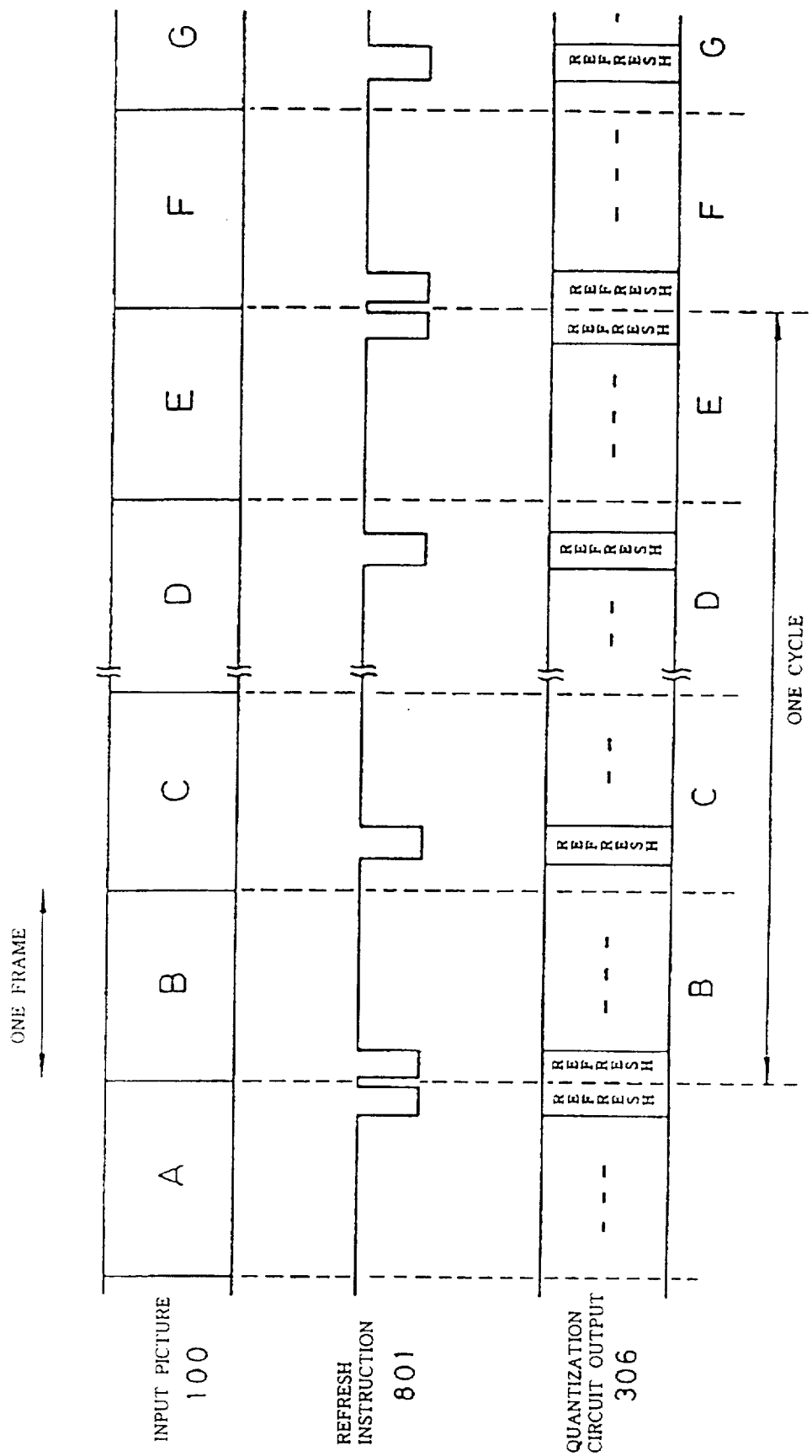
FIG. 4 is a time chart illustrating an example of operation of the picture coding apparatus of FIG. 3.

Picture input 100, refresh instruction signal 801 and the output of quantization circuit 3 are illustrated in FIG. 4. Referring to FIG. 4, each portion denoted as REFRESH in the output of the quantization circuit is a result of quantization of input picture 100, and the other portions show results of quantization of a difference signal of input picture 100 from the last frame.

Referring back to FIG. 3, another block including page starting signal detector 7, encipherment control section 8, encipherment unit 9, coding switch 10 and multiplexing section 11 executes and controls encipherment of the output of variable length coder 6. Operation of the block is described with reference to FIG. 5.

Figure 5:
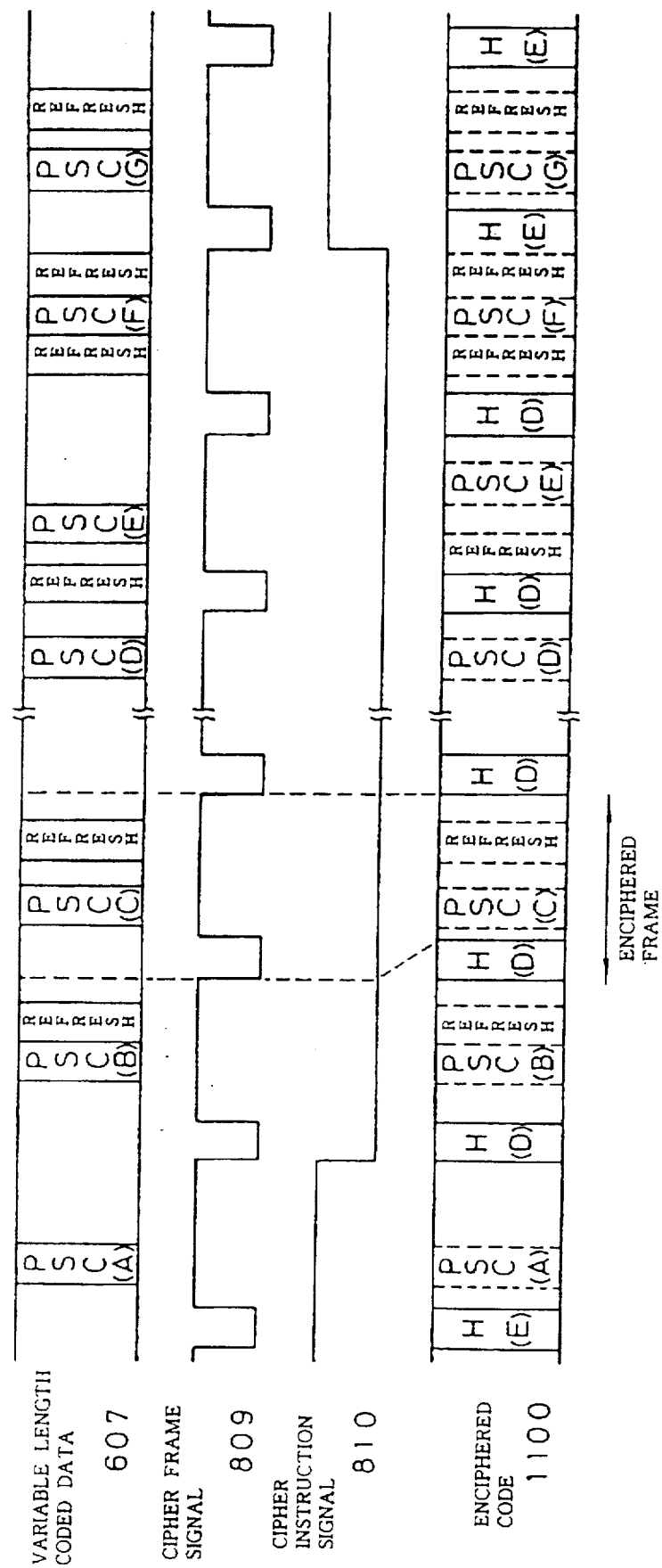
FIG. 5 is a time chart illustrating details of the operation of the picture coding apparatus of FIG. 3.

While the output of variable length coder 6 is illustrated in FIG. 5, the total code length per one frame depends upon a picture. The output of variable length coder 6 is inputted to encipherment unit 9. Encipherment unit 9 executes encipherment of input data for each cipher frame of a fixed length. In particular, encipherment unit 9 generates a cipher frame in response to a cipher frame signal of a fixed period outputted from encipherment control section 8 to execute encipherment.

Coding switch 10 operates in response to cipher instruction signal 810 from encipherment control section 8 and selectively outputs one of the outputs from either the encipherment unit 9 or the output of variable length coder 6 in accordance with contents of cipher instruction signal 810. Encipherment control section 8 effects switching of cipher instruction signal 810 in synchronism with cipher frame signal 809.

Page starting signal detector 7 detects a page starting signal (PSC) from the output (variable length coded data 607) of variable length coding unit 6 and notifies encipherment control section 8 of the detected page starting signal. Encipherment control section 8 counts the number of occurrences of PSC after encipherment is stopped in accordance with cipher instruction signal 810, and controls cipher instruction signal 801 so as to start encipherment again after the period of at least one refresh cycle has elapsed.

Further, encipherment control section 8 generates a header for each cipher frame and an encipherment proceeding/stopping signal (signal 811 in FIG. 3) following the header and outputs them to multiplexing section 11. Multiplexing section 11 multiplexes the output from coding switch 10 and cipher frame header 811 from encipherment control section 8 and sends them out as enciphered code data 1100.

In the enciphered code data illustrated in FIG. 5, each portion represented as H(E) denotes a cipher frame header which indicates proceeding of an enciphering operation, and each portion represented as H(D) denotes another cipher frame header which indicates stopping of an enciphering operation. In this manner, frame heads are not made an object for encipherment.

Next, operation when the enciphered code data described above are received by a picture decoding apparatus having no cipher decoding device is described with reference to FIGS. 6, 7 and 8.

Figure 6:
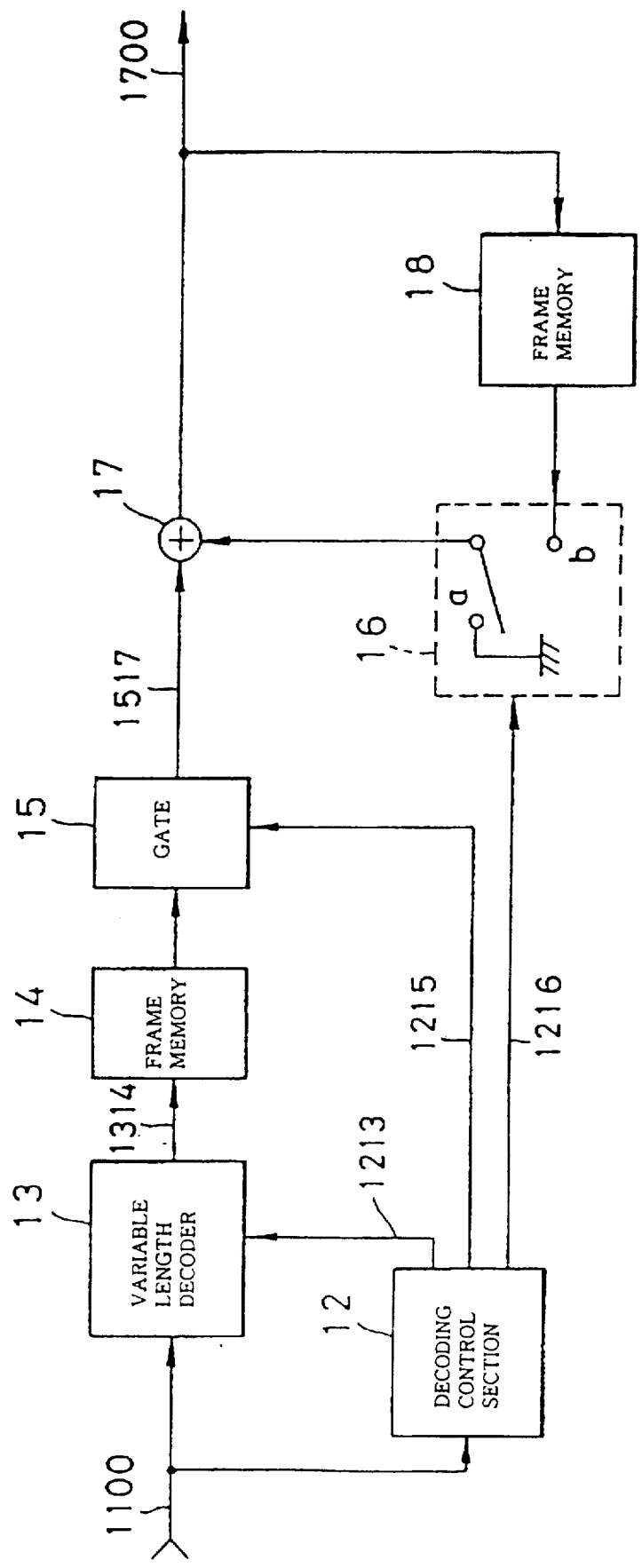
FIG. 6 is a block diagram of a picture decoding apparatus of an embodiment of the present invention.

Referring first to FIG. 6, variable length decoder 13 executes a variable length decoding operation in response to variable length decoding instruction signal 1213 from decoding control section 12. Decoding control section 12 receives enciphered code data 1100 and detects a non-enciphered header of a cipher frame from the input data train. When the decoding control section 12 detects a first frame for which encipherment is stopped, it detects page starting signal PSC appearing subsequently and activates variable length decoder 13 at that point in time.

Further, decoding control section 12 continues detection of a cipher frame header and stops operation of variable length decoder 13 at the point in time when a frame for which encipherment is stopped is detected. An operation time chart of the control is shown in FIG. 7. Variable length decoder 13 operates in a section in which variable length decoding instruction signal 1213 is "0".

Figure 7:
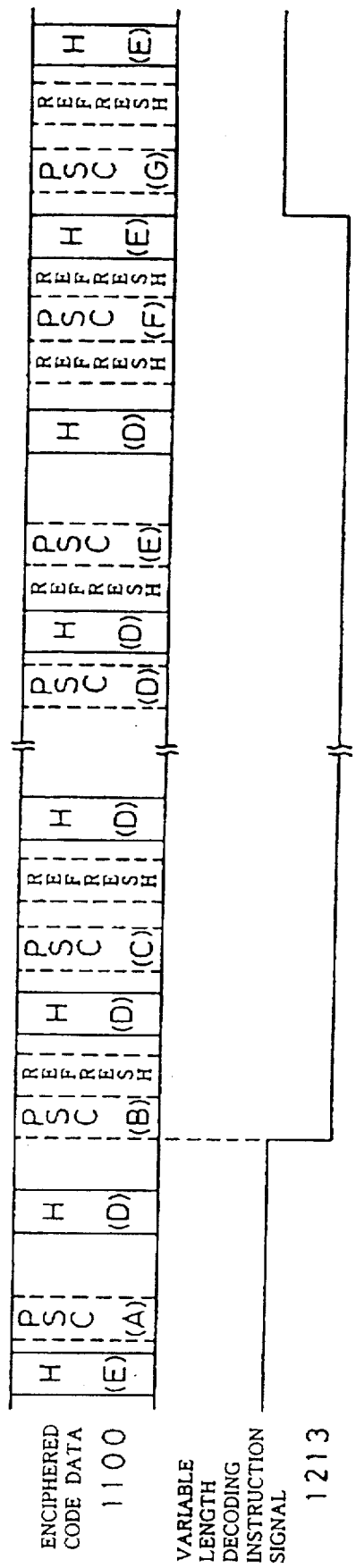
FIG. 7 is a time chart illustrating an example of operation of the picture decoding apparatus of FIG. 6.

Referring to FIG. 7, frames corresponding to PSC(B) to PSC(E) correspond to one refresh cycle, and a correct picture of one full screen is decoded from codes in this section of the frames. However, since a cipher frame and a frame of variable length coded picture data are not synchronized with each other, when variable length decoder 13 stops its operation, part of one frame of a picture corresponding to PSC(F) is included in the decoded picture. This makes a signal represented as decoded picture 1314 in FIG. 8. This decoded picture 1314 is stored into frame memory 14 of FIG. 6. Frame memory 14 has the capacity of one frame of a picture and outputs decoded picture 1314 inputted thereto after delaying it by one frame period.

Gate 15 has a function of fixing the level of an input signal to the "0" level in response to an instruction from decoding control section 12 and outputting the thus fixed level. Decoding control section 12 first stops operation of variable length decoder 13 by variable length decoding instruction signal 1213 and then fixes the level of an incomplete decoded picture (corresponding to a portion denoted by F in decoded picture 1314 of FIG. 8) to the "0" level by gate control signal 1215.

Referring back to FIG. 6, the block including picture switch 16, adder 17 and frame memory 18 generates, when a picture decoded by variable length decoder 13 is an incomplete decoded picture, a picture from decoded picture 1517 is extracted from gate 15.

Operation of picture switch 16 is controlled by intraframe instruction signal 1216 from decoding control section 12 so that it selects the output from frame memory 18 or the "0" level. When decoded picture signal 1517 is a signal coded in the intraframe mode, picture switch 16 outputs the "0" level in accordance with intraframe instruction signal 1216 from decoding control section 12, and consequently, the output of adder 17 coincides with decoded picture 1517 and is outputted as picture output 1700.

Picture output 1700 is inputted also to frame memory 18 and is thereafter used for coding in the interframe coding mode upon outputting of a next frame.

When decoded picture 1517 is a picture coded by interframe coding, a picture of the last frame is outputted from picture switch 16 in response to intraframe instruction signal 1216 from decoding control section 12 so that picture data are reproduced.

For a period for which encipherment is proceeding, a picture of the last frame is outputted from picture switch 16 in response to intraframe instruction signal 1216 from decoding control section 12 while the "0" level is outputted from gate 15 in response to gate control signal 1215, and accordingly, contents of the last frame are outputted repetitively. The manner is illustrated in FIG. 8.

Figure 8:
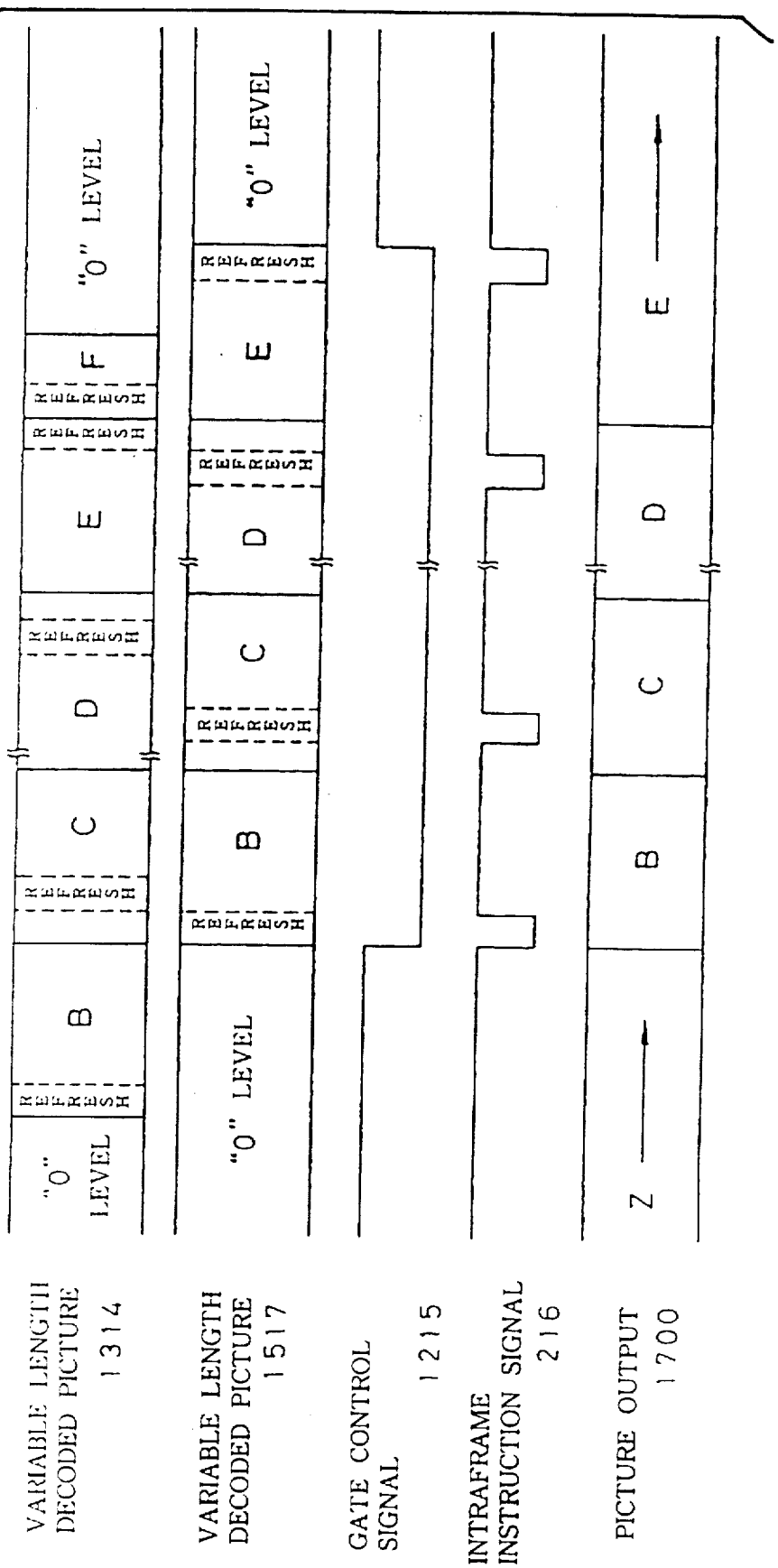
FIG. 8 is a time chart illustrating details of the operation of the picture decoding apparatus of FIG. 6.

Referring to FIG. 8, a portion represented as Z of picture output 1700 indicates that contents of the last frame in the last cipher stopping period are maintained.

As described above, according to the present invention, a system for enciphering and transmitting a moving picture after coding the moving picture using intraframe and interframe coding is constructed so that a frame region corresponding to at least one screen region is coded by intraframe coding and in addition, encipherment is stopped for the portion to transmit the data of that portion. Consequently, a not-enciphered picture signal can be received and decoded correctly even by a receiver apparatus which does not have a device for decoding enciphered code data. Accordingly, it is possible even for a picture transmission system, which provides an image to only paying subscribers, to provide a picture message substantially at an arbitrary time to a non-subscriber. Accordingly, there is an advantage that the picture transmission system can be utilized for advertising to non-subscribers.

Although the variations of the embodiment described above are possible, the scope of the present invention is defined in the appended claims.

What is claimed is:

1. A digital video signal transmission system for transmitting digital video signal segments, said transmission system comprising:

a coding device coding the digital video signal as coded data, the coding device coding at least a first portion of at least one unenciphered digital video signal segment in an intraframe mode and coding at least a second portion of the at least one unenciphered digital video signal segment in an interframe mode, wherein the at least one unenciphered digital video signal segment further comprises a plurality of frames;

a divider dividing each of said plurality of frames into N frame regions corresponding to N screen regions of a display screen, N being an integer greater than or equal to 2, said N frame regions being in addition to and unrelated to any division of said frames used for said coding; and a transmitter transmitting the coded data.

2. The digital video signal transmission system of claim 1, wherein a frame region corresponding to each screen region is coded in the intraframe mode.

3. The digital video signal transmission system of claim 2, wherein the remaining frame regions are coded in the interframe mode.

4. The digital video signal transmission system of claim 1, wherein a single frame region in each of N frames is coded in the intraframe mode, such that a frame region corresponding to each screen region is coded in the intraframe mode.

5. The digital video signal transmission system of claim 4, wherein the N frames are consecutive frames.

6. The digital video signal transmission system of claim 4, wherein the remaining frame regions of the N frames are coded in the interframe mode.

7. The digital video signal transmission system of claim 6, wherein the N frames are consecutive frames.

8. A digital video signal receiving system for receiving digital video signal segments comprising:

a receiver receiving a digital video signal coded as coded data, the digital video signal including a plurality of frames, each of said plurality of frames being divided into N frame regions corresponding to N screen regions on a display screen, N being an integer greater than or equal to 2, said N frame regions being in addition to and unrelated to any division of said frames used in a coding of said coded data; and a decoding device decoding the coded data, the coding device decoding at least a first portion of at least one unenciphered digital video signal segment being coded in an intraframe mode and decoding at least a second portion of the at least one unenciphered digital video signal segment being coded in an interframe mode.

9. The digital video signal receiving system of claim 8, wherein a frame region corresponding to each screen region is coded in the intraframe mode.

10. The digital video signal receiving system of claim 9, wherein the remaining frame regions are coded in the interframe mode.

11. The digital video signal receiving system of claim 8, wherein a single frame region in each of N frames is coded in the intraframe mode, such that a frame region corresponding to each screen region is coded in the intraframe mode.

12. The digital video signal receiving system of claim 11, wherein the N frames are consecutive frames.

13. The digital video signal receiving system of claim 11, wherein the remaining frame regions of the N frames are coded in the interframe mode.

14. The digital video signal receiving system of claim 13, wherein the N frames are consecutive frames.

* * * * *